(12) United States Patent
Diab

(10) Patent No.: US 9,215,193 B2
(45) Date of Patent: Dec. 15, 2015

(54) SYSTEM AND METHOD FOR ENHANCED ENERGY CONTROL POLICY FOR UNMANAGED SWITCH APPLICATIONS

(75) Inventor: Wael William Diab, San Francisco, CA (US)

(73) Assignee: BROADCOM CORPORATION, Irvine, CA (US)

( * ) Notice: Subject to any disclaimer, the term of this patent is extended or adjusted under 35 U.S.C. 154(b) by 806 days.

(21) Appl. No.: 12/792,857

(22) Filed: Jun. 3, 2010

(65) Prior Publication Data

US 2011/0161522 A1 Jun. 30, 2011

Related U.S. Application Data

(60) Provisional application No. 61/290,285, filed on Dec. 28, 2009.

(51) Int. Cl.
*G06F 15/16* (2006.01)
*H04L 12/931* (2013.01)

(52) U.S. Cl.
CPC ............. *H04L 49/35* (2013.01); *Y02B 60/43* (2013.01); *Y02B 60/44* (2013.01)

(58) Field of Classification Search
CPC . H04L 49/35; H04L 12/2434; G06F 2216/05; G06F 1/3246; G06F 1/325; G06F 1/3287; G09G 2330/021; H04N 1/00891; H04N 1/00896

USPC .......................................................... 709/246
See application file for complete search history.

(56) References Cited

U.S. PATENT DOCUMENTS

| | | | |
|---|---|---|---|
| 6,983,384 B2 * | 1/2006 | Iwaki .............................. 713/300 |
| 2007/0025039 A1 * | 2/2007 | Sousa et al. ...................... 361/90 |
| 2007/0150763 A1 * | 6/2007 | Yang et al. ..................... 713/300 |
| 2008/0249667 A1 * | 10/2008 | Horvitz et al. ..................... 701/1 |
| 2009/0077395 A1 * | 3/2009 | Tsai ............................... 713/310 |
| 2009/0154465 A1 * | 6/2009 | Diab et al. .................. 370/395.1 |
| 2009/0185565 A1 * | 7/2009 | Diab et al. ..................... 370/394 |
| 2009/0195349 A1 * | 8/2009 | Frader-Thompson et al. 340/3.1 |
| 2009/0217065 A1 * | 8/2009 | Araujo, Jr. ..................... 713/320 |
| 2011/0077758 A1 * | 3/2011 | Tran et al. ....................... 700/94 |

* cited by examiner

*Primary Examiner* — Esther B Henderson
(74) *Attorney, Agent, or Firm* — Foley & Lardner LLP

(57) ABSTRACT

A system and method for enhanced energy control policy for unmanaged device applications. EEE control customizations are provided to a profile element (e.g., PROM, EEPROM, flash memory, system memory, input pins, etc.) that is included in the unmanaged device. The configuration information stored in profile element is accessed by an EEE control policy for customization of the EEE control policy. In one embodiment, the EEE control customization can be generated by another device (e.g., managed device) separate from the unmanaged device.

20 Claims, 5 Drawing Sheets

SYSTEM AND METHOD FOR ENHANCED ENERGY CONTROL POLICY FOR UNMANAGED SWITCH APPLICATIONS

This application claims priority to provisional patent application No. 61/290,285, filed Dec. 28, 2009, which is incorporated by reference herein, in its entirety, for all purposes.

BACKGROUND

1. Field of the Invention

The present invention relates generally to energy efficient Ethernet (EEE) and, more particularly, to a system and method for enhanced energy control policy for unmanaged switch applications.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

The application itself can also be a significant consideration. For example, one level of analysis can consider whether the application is a home network, service provider, enterprise, or a data center. The analysis can go deeper still by examining scenarios such as the type of network element within a given application. For example, the analysis can consider whether it is a gateway or a switch in a home network, or can consider whether it is a wiring closet or aggregation point in an enterprise network. The particular use of the network element can also be considered, such as whether it is an audio-video bridging (AVB) switch for the home running a streaming application.

Implementation of various solutions in various applications is based on an EEE control policy. What is needed is an EEE solution that effectively addresses unmanaged switch applications.

SUMMARY

A system and/or method for enhanced energy control policy for unmanaged switch applications savings, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy Efficient Ethernet (EEE) networks attempt to save power when the traffic utilization of the network is not at its maximum capacity. This serves to minimize the performance impact while maximizing power savings. At a broad level, the EEE control policy for a particular link in the network determines when to enter a power saving state, what power saving state (i.e., level of power savings) to enter, how long to remain in that power saving state, what power saving state to transition to out of the previous power saving state, etc. In one example, an EEE control policy can base these decisions on a combination of static settings established by an IT manager and the properties of the traffic on the link itself. In another example, EEE control policy can be dynamic in nature but have static settings (e.g., thresholds under which a new EEE control policy can be initiated).

Figure 1:
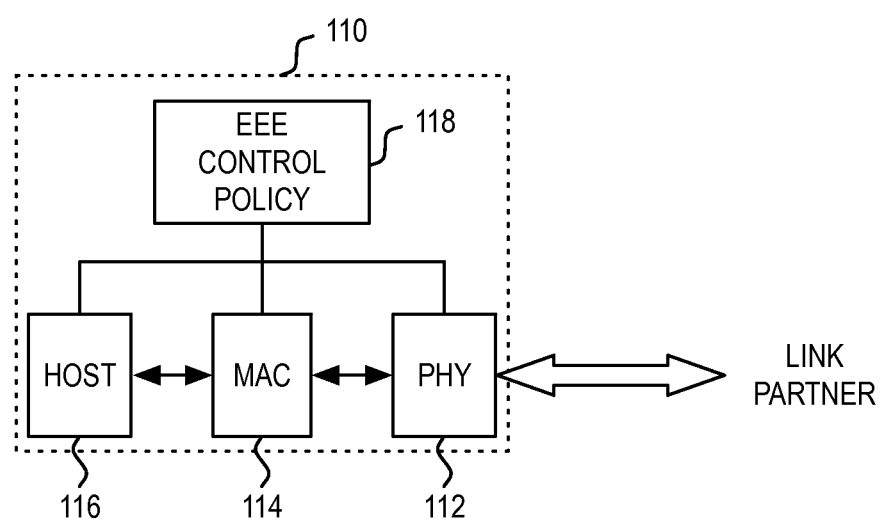
FIG. 1 illustrates an example of an EEE control policy implemented in an enterprise managed switch.

FIG. 1 illustrates an example of an enterprise managed (or fully managed) switch to which an EEE control policy can be applied. Enterprise managed switches are typically found in networks with a large number of switches and connections, where centralized management provides significant savings in administrative time and effort. In general, an enterprise managed switch can have a full set of management features (e.g., command-line access (e.g., TELNET and SSH), simple network management protocol (SNMP) agent, application programming interfaces (APIs), etc.). The enterprise managed switch can also be designed to manipulate configurations, such as the ability to display, modify, backup and restore configurations.

As illustrated in FIG. 1, enterprise managed switch 110 includes physical layer device (PHY) 112, media access control (MAC) 114, and host 116. In general, host 116 can comprise suitable logic, circuitry, and/or code that may enable operability and/or functionality of the five highest functional layers for data packets that are to be transmitted over the link. Since each layer in the OSI model provides a service to the immediately higher interfacing layer, MAC controller 114 can provide the necessary services to host 116 to ensure that packets are suitably formatted and communicated to PHY 112. MAC controller 114 can comprise suitable logic, circuitry, and/or code that may enable handling of data link layer (Layer 2) operability and/or functionality. MAC controller 114 can be configured to implement Ethernet protocols, such as those based on the IEEE 802.3 standard, for example. PHY 112 can be configured to handle physical layer requirements, which include, but are not limited to, packetization, data transfer and serialization/deserialization (SERDES).

In general, controlling the data rate of the link may enable the enterprise managed switch and possibly its link partner to communicate in a more energy efficient manner. More specifically, a reduction in link rate to a sub-rate of the main rate enables a reduction in power, thereby leading to power savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of subrating is through the use of a low power idle (LPI) technique. In general, LPI relies on entering a quiet state where power savings can be achieved when there is nothing to transmit. Power is thereby saved when the link is off. Refresh signals can be sent periodically to enable wake up from the sleep mode.

In general, both the subset and LPI techniques involve turning off or otherwise modifying portions of the PHY during a period of low link utilization. As in the PHY, power savings in the higher layers (e.g., MAC) can also be achieved by using various forms of subrating as well.

As FIG. 1 illustrates, enterprise managed switch 110 also includes EEE control policy entity 118. In general, EEE control policy entity 118 can be designed to determine when to enter a power saving state, what power saving state (i.e., level of power savings) to enter, how long to remain in that power saving state, what power saving state to transition to out of the previous power saving state, etc. As noted, EEE control policy entity 118 can be designed to include both static and dynamic elements.

Figure 2:
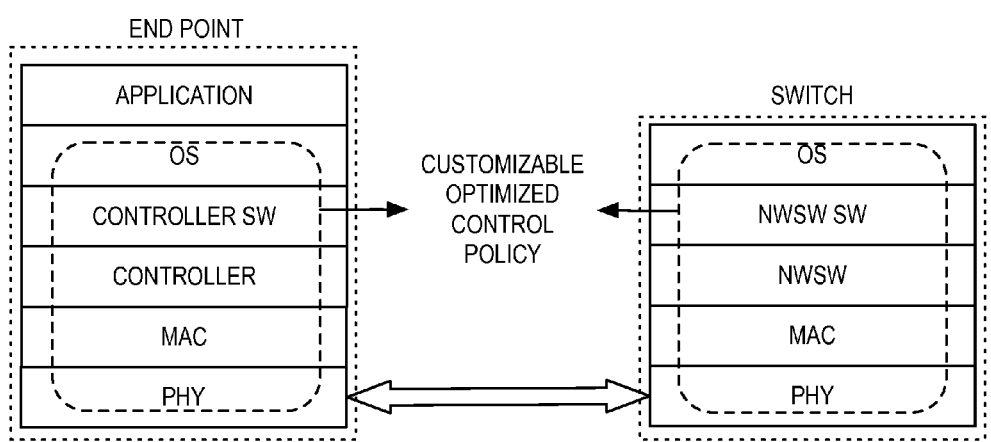
FIG. 2 illustrates an example of an EEE control policy in a protocol stack.

EEE control policy entity 118 in enterprise managed switch 110 includes software code that can interoperate with various layers, including portions of the PHY, MAC, switch, or other subsystems in the host. EEE control policy entity 118 can be enabled to analyze traffic on the physical link and to analyze operations and/or processing of data in itself or in its link partner. In this manner, EEE control policy entity 118 can exchange information from, or pertaining to, one or more layers of the OSI hierarchy in order to establish and/or implement the EEE control policy. FIG. 2 illustrates an example of an EEE control policy, which can touch various layers on both ends (e.g., controller and network switch) of the link to produce a customizable and optimized control policy.

In general, a managed switch has a configuration interface that a system administrator can use to configure features of the managed switch. For example, managed switches may provide a configuration interface in the form of command-line access, SNMP, APIs, "Websmart," etc. that enables remote management. Through the configuration interface, the system administrator can configure and monitor the managed switch.

The software-based EEE control policy 118 in enterprise managed switch 110 can be designed to base its decisions on EEE settings, parameters and configurations that are established by a system administrator through the configuration interface. For example, the system administrator can establish empty or non-empty conditions of ports, queues, buffers, etc. to determine whether to transition to or from a power saving state.

Unlike the software-based enterprise managed switches that boast a robust set of management features, unmanaged switches are relatively unsophisticated. In general, unmanaged switches are typically the least expensive switches (e.g., gateway) that are commonly found in homes, home offices, and small businesses. Unmanaged switches are relatively unsophisticated switches and may not include a configuration interface or configurable features. Unmanaged switches are not flexible in functionality and do not include monitoring functionality. As such, unmanaged switches are typically plug and play devices that are configured by the manufacturer purely for switching functions. Unmanaged switches typically do not incorporate customer-visible software that can be customized as needed. Notwithstanding the relative simplicity of such devices, it is still desired to realize customized EEE power savings in such devices, which are deployed on a wide-scale basis.

For example, computing environments such as medium and large enterprise environments, can include computer networks having very large numbers of networking devices (e.g., hundreds and even thousands of network switches designed to interconnect large numbers of computing devices). These computer networks can include a mix of managed and unmanaged devices that are connected in complex network topologies. While these unmanaged devices provide a valuable role in these enterprise environments due to their low cost, there is still a desire to configure the unmanaged devices for power savings. As a result, an ability to configure these unmanaged devices for power savings is important.

It is therefore a feature of the present invention that unsophisticated devices such as an unmanaged switch can be designed with a configurable EEE control policy to realize energy savings. In one embodiment of the present invention, a configurable EEE control policy can be effected in an unmanaged switch using a configurable profile.

Figure 3:
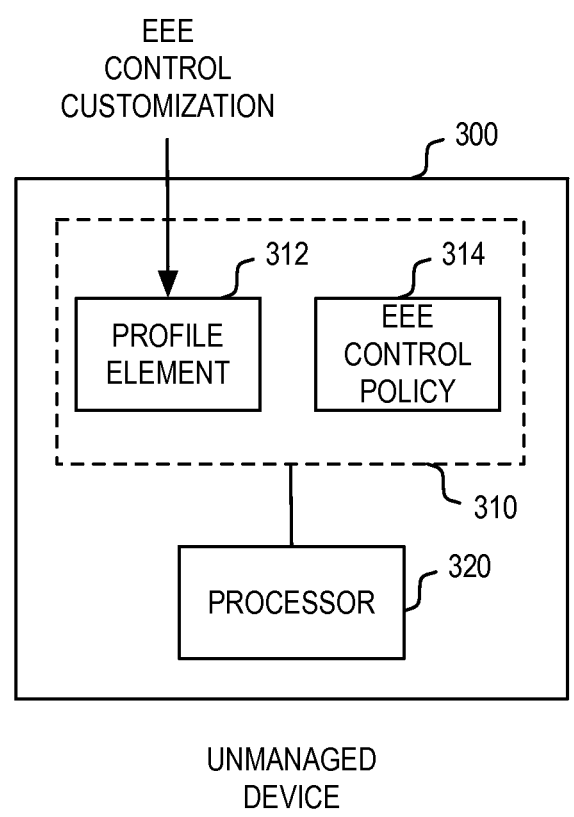
FIG. 3 illustrates an example of an EEE control policy implemented in an unmanaged switch.

FIG. 3 illustrates an example of such an embodiment. As illustrated, unmanaged device 300 reflects an EEE control customization in profile element 312 contained as part of memory 310. Profile element 312 can be designed to store EEE parameters, instructions, settings, binary images, etc. This stored information is usable by EEE control policy 314 when EEE control policy 314 is executed by an embedded or external processor 320.

In one embodiment, profile element 312 and EEE control policy 314 is implemented in the same memory device (e.g., on-board memory) as EEE control policy 314. In another embodiment, profile element 312 is a memory device separate from the memory device containing EEE control policy 314. For example, profile element 312 can be embodied as a PROM, EEPROM, flash memory, etc. This embodiment enables profile element 312 to be added to unmanaged device 300 by the manufacturer, distributor, customer, or any other entity responsible for configuring the EEE function of the unmanaged device prior to deployment into the network.

For example, in one scenario, a configurable PROM memory can be installed during manufacturing to effect a particular EEE control policy that would be expected based on a selected configuration (e.g., number of ports, buffer size, etc.) of the unmanaged device. For example, the original design manufacturer (ODM) can, at the last second, install a version of the PROM for a home network version of the device and package it that way, or install a version of the PROM for a SMB network version of the device and package it that way. By this process, the same product can be sold in different markets with slightly different packaging at vastly different cost points.

Here, it is significant to note that the inclusion of profile element 310 that reflects an EEE control customization enables an unmanaged device to implement a configurable or optimized control policy for energy savings, thereby obviating the need to run sophisticated software such as that included in an enterprise managed device.

In another embodiment, the EEE control policy can be effected using boot-strapping functions (e.g., input pin combinations). Here, an entity responsible for configuring the EEE function of the unmanaged device can select a combination of input pin that can determine an EEE parameter. For example, the input pins can be used to indicate a level of aggressiveness of the EEE control policy, timer values, amount of buffering, etc. of the unmanaged device. As would be appreciated, these pins can be set by any entity responsible for configuring the EEE function of the unmanaged device prior to functioning in the network. This example illustrates the importance of having a mechanism that can customize an EEE control policy to an expected application. As noted above, traffic profiles in different applications/networks may require different settings of parameters and/or different levels of aggressiveness of energy savings versus performance for those applications/networks.

As these examples illustrate, profile element 312 in unmanaged device can be embodied in various forms. Regardless of the particular form in which EEE control customizations can be reflected in unmanaged switch 300, the inclusion of profile element 310 in unmanaged device 300 enables a customizable EEE control policy to be realized in unmanaged device 300.

In another embodiment, the EEE control customization can be generated by another device separate from the unmanaged device. For example, consider a scenario where a second device is a relatively sophisticated device that retains a user interface. This user interface can be used to generate an EEE control customization that can be transferred to unmanaged device 300 for storage in profile element 310.

Figure 4:
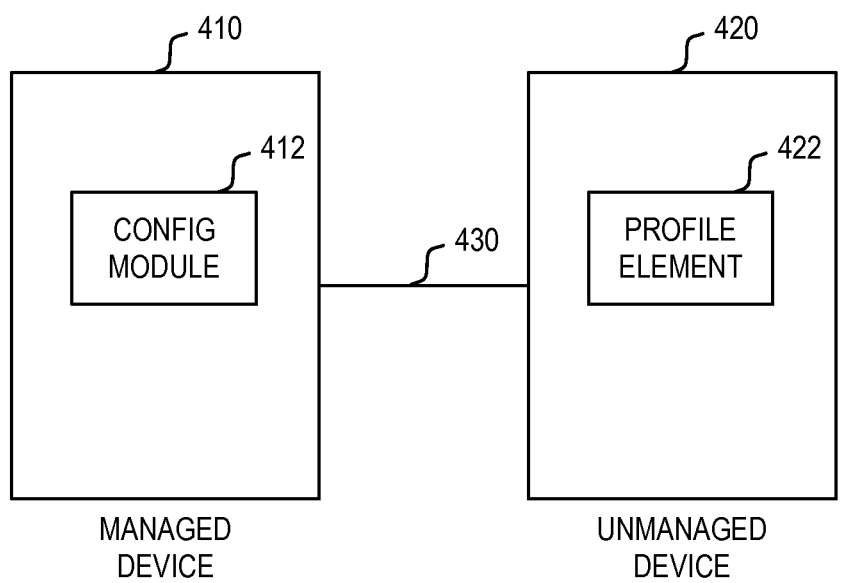
FIG. 4 illustrates an example of a managed device configuring an unmanaged device.

FIG. 4 illustrates one embodiment where the second device is a managed device. As illustrated, managed device 410 is coupled to unmanaged device 420 via link 430. Managed device 410 includes configuration module 412. Configuration module 412 is designed to provide configuration information to profile element 422 in unmanaged device 420. The configuration information transferred to profile element 422 is stored for the configuration of EEE control policy 420. In one embodiment, managed device 410 can represent a network device such as a switch.

In yet another embodiment, the EEE control customization can be generated through a web interface that enables a customer to specify EEE control policy parameters. For example, a relatively unsophisticated unmanaged device can be designed to present a web interface to a user. Through the web interface, the user can specify various EEE parameters (e.g., level of aggressiveness, timer values, amount of buffering, etc.) that can be translated into an EEE control policy image that is stored in profile element 310. In this manner, the EEE control policy customization is again retained without requiring the use of complex software in the device.

In another embodiment, a computing device or neighboring switch can be designed to run a preloaded GUI/application that is designed to generate and send specific management packets to the unmanaged device being programmed. The management packets can then be used to override the defaults, add profiles, etc. to the unmanaged device. In yet another embodiment, the unmanaged device can be designed, upon wake-up, to download profiles from a known pre-programmed address (e.g., stored in flash memory) in the network.

Figure 5:
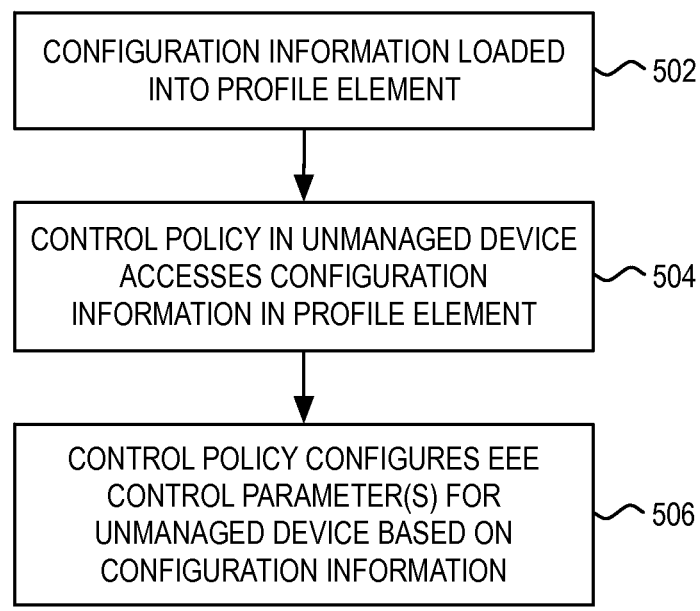
FIG. 5 illustrates a flowchart of a process of the present invention.

Having described a general framework of enabling EEE configurability of an unmanaged device, reference is now made to the flowchart of FIG. 5, which illustrates a process of the present invention. As illustrated, the process begins at step 502 wherein configuration information is loaded into a profile element. The profile element can be a part of system memory that stores the EEE control policy or a separate memory device (e.g., PROM, EEPROM, flash memory, etc.). As such, the profile element can be loaded into the unmanaged device by any entity responsible for configuring the EEE function of the unmanaged device prior to functioning in the network. Where the profile element is represented by pin inputs, the pin settings can be set at any time prior to functioning of the unmanaged device in the network.

After the configuration information is loaded into the profile element, the EEE control policy in the unmanaged device can then access the configuration information stored by the profile element at step 504. This access of the profile element by the EEE control policy facilitates the customization of the EEE control policy as the configuration information dictates one or more aspects of operation of the EEE control policy. In other words, the EEE control policy can be customized without direct interaction with the EEE control policy. Finally, at step 506, the EEE control policy configures one or more EEE control parameters for the unmanaged device based on the configuration information. This completes the custom configuration process of the EEE control policy.

As would be appreciated, the principles of the present invention can be applied to various devices such as a switch, controller, server, VOIP phone, WAP, etc. that retain relatively unsophisticated EEE control features.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:
1. A system for customizing an energy efficiency control in an unmanaged device, comprising:
   circuitry configured to implement an energy efficient Ethernet control policy, data relating to said energy efficient Ethernet control policy being resident in a memory of said unmanaged device; and one or more input pins that are individually selectable by a user, wherein a value indicated by a position of said one or more input pins is used by said energy efficient Ethernet control policy to determine a mechanism by which said energy efficient Ethernet control policy analyzes operational data of said unmanaged device to determine a need to transition between two or more power states, said one or more input pins configured to provide the user with control of one or more parameters of said energy efficient Ethernet control policy to switch said energy efficient Ethernet control policy between a plurality of levels of aggressiveness, each of said plurality of levels of aggressiveness implementing a different level of balance between energy savings and performance of said unmanaged device.

2. The system of claim 1, wherein said one or more input pins are further used by the circuitry to determine a timer value for said energy efficient Ethernet control policy.

3. The system of claim 1, wherein said one or more input pins are further used by the circuitry to determine an amount of buffering for said energy efficient Ethernet control policy.

4. The system of claim 1, wherein a position of said one or more input pins is based on physical movement by a user of said one or more input pins.

5. A method, comprising:
prior to active operation of an energy efficiency control policy in a network device in analyzing operational data of said network device to determine a need to transition between two or more power states, accessing configuration information as indicated by one or more input pins that are physically movable by a user; and
incorporating said accessed configuration information into said energy efficiency control policy, wherein said incorporation of said accessed configuration information into said energy efficiency control policy defines a mechanism by which said energy efficiency control policy analyzes operational data of said network device to determine a need to transition between two or more power states, said one or more input pins configured to provide the user with control of one or more parameters of said energy efficiency control policy to switch said energy efficiency control policy between a plurality of levels of aggressiveness, each of said plurality of levels of aggressiveness implementing a different level of balance between energy savings and performance of said network device.

6. The method of claim 5, wherein said configuration information is further used to determine an amount of buffering used by said energy efficiency control policy.

7. The method of claim 5, wherein said network device is a switch.

8. The method of claim 5, wherein said network device is a controller.

9. The method of claim 5, wherein said network device is a server.

10. The method of claim 5, wherein said network device is a voice over IP phone.

11. The method of claim 5, wherein said network device is a wireless access point.

12. A method, comprising:
receiving configuration information in a network device via one or more input pins that are physically movable by a user, wherein positional values of said one or more input pins indicate one of a plurality of levels of aggressiveness;
accessing, by an energy efficiency control policy in said network device, said configuration information as indicated by said positional values of said one or more input pins, said energy efficiency control policy configured to determine a need to transition between two or more power states based on an analysis of operational data of said network device, said one or more input pins configured to provide the user with control of one or more parameters of said energy efficiency control policy to switch said energy efficiency control policy between said plurality of levels of aggressiveness, each of said plurality of levels of aggressiveness implementing a different level of balance between energy savings and performance of said network device;
configuring a level of aggressiveness used by said energy efficiency control policy based on said accessed configuration information; and
analyzing, by said energy efficiency control policy, operational data of said network device in accordance with said configured level of aggressiveness.

13. The method of claim 12, wherein said network device is a switch.

14. The method of claim 12, wherein said network device is a controller.

15. The method of claim 12, wherein said network device is a server.

16. The method of claim 12, wherein said network device is a voice over IP phone.

17. The method of claim 12, wherein said network device is a wireless access point.

18. The method of claim 12, wherein said one or more input pins are further used to determine a timer value for said energy efficiency control policy.

19. The method of claim 12, wherein said one or more input pins are further used to determine an amount of buffering for said energy efficiency control policy.

20. The method of claim 5, wherein said configuration information is further used to determine a timer value used by said energy efficiency control policy.

* * * * *